United States Patent [19]

Akiyama et al.

[11] 4,125,277
[45] Nov. 14, 1978

[54] SAFETY BELT ARRANGEMENT WITH A BELT HANGER

[75] Inventors: Yoshinori Akiyama; Kenshi Kurami, both of Yokohama; Junichiro Takeshita, Kamakura; Takeo Furuya, Yokohama, all of Japan

[73] Assignee: Nissan Motor Company, Limited, Japan

[21] Appl. No.: 833,670

[22] Filed: Sep. 15, 1977

Related U.S. Application Data

[63] Continuation of Ser. No. 713,239, Aug. 10, 1976, abandoned, which is a continuation of Ser. No. 597,712, Jul. 12, 1975, abandoned.

[30] Foreign Application Priority Data

Jul. 22, 1974 [JP] Japan .................................. 49/83912

[51] Int. Cl.² ............................................. B60R 21/02
[52] U.S. Cl. .................................................... 280/745
[58] Field of Search ................. 280/745; 297/388, 389

[56] References Cited

U.S. PATENT DOCUMENTS

| 3,764,161 | 10/1973 | Bright et al. ........................... 280/745 |
| 3,856,327 | 12/1974 | Otani ...................................... 280/745 |
| 3,865,397 | 2/1974 | Pilhall et al. ........................... 280/745 |

*Primary Examiner*—Robert R. Song
*Attorney, Agent, or Firm*—Robert E. Burns; Emmanuel J. Lobato; Bruce L. Adams

[57] ABSTRACT

An occupant restraining belt arrangement for a vehicle having a lap belt with one end fixed to a lower rear portion on the inside of a vehicle door. A first inertia retractor is mounted adjacent a lower inboard portion of a vehicle seat to receive and retract the other end of the lap belt. A shoulder belt has one end secured to an intermediate portion of the lap belt. A second inertia retractor is mounted adjacent an outboard portion of a roof of the vehicle body behind the seat to receive and retract the other end of the shoulder belt and a belt hanger is fixedly mounted on the vehicle body within the occupant compartment forward and above the seat. The length along the lap belt between the one end thereof and the intermediate portion thereof and the length of the shoulder belt, when the shoulder belt is fully extended from the second inertia retractor, are so determined as to provide an arrangement in which when the shoulder belt is hung on the belt hanger and the door is opened to its fully opened position, the lap belt and the shoulder belt assume a position for easy entry of an occupant in which the intermediate portion of the lap belt takes a position spaced forward of the body of an occupant of the seat. When the shoulder belt is removed from the belt hanger and the door is closed, the lap belt and shoulder belt take an occupant-restraining position in which the intermediate portion of the lap belt takes a position adjacent an outboard portion of the seat so that the shoulder belt extends across the chest of the occupant of the seat.

1 Claim, 1 Drawing Figure

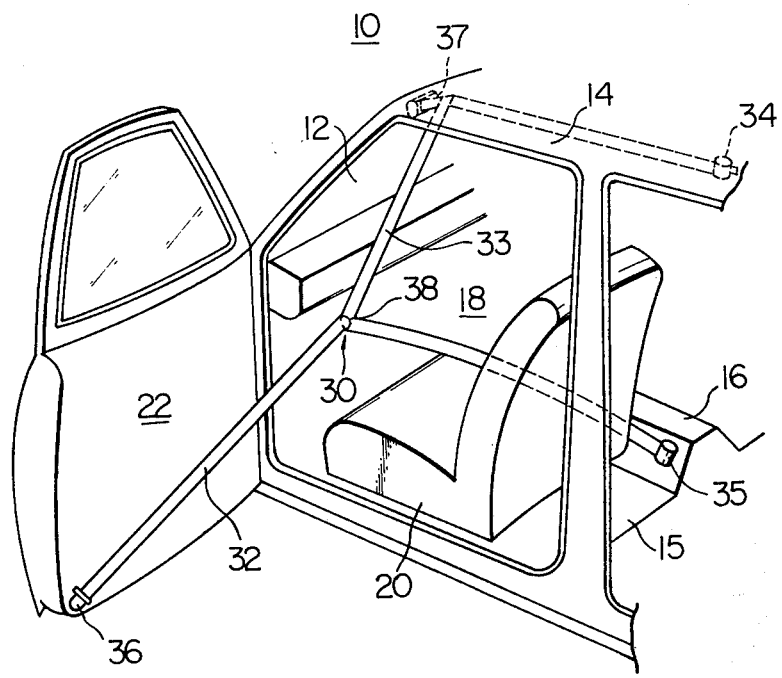

SAFETY BELT ARRANGEMENT WITH A BELT HANGER

This application is a continuation of now-abandoned application Ser. No. 713,239, filed Aug. 10, 1976, which is a continuation of application Ser. No. 597,712, filed July 21, 1975, now abandoned.

BACKGROUND OF THE INVENTION

This invention relates generally to a vehicle occupant restraining safety belt arrangement and particularly to such a belt arrangement in which a portion of the belt is operatively connected to inertia retractor means and another portion to a vehicle door whereby the belt is moved to and from an occupant restraining position in accordance with door opening and closing movements.

SUMMARY OF THE INVENTION

An object of this invention is to provide a safety belt arrangement which is most easily operable partly by the occupant's or operator's hand and partly automatically by inertia retractor means for movement between an easy-entry position and an occupant restraining position in response to door opening and closing movements.

One of the features of this invention is that it provides a belt hanger in the form of a hooked arm which is mounted on a forward corner portion inboard of the body roof in order that a portion of the belt may manually be hung on the hanger to allow the belt to assume the easy-entry position.

BRIEF DESCRIPTION OF THE DRAWING

Other objects, features and advantages of this invention will be readily apparent from the following detailed description and appended claims, reference being made to the accompanying single FIGURE in which a schematic perspective view of a vehicle body portion incorporating the safety belt arrangement of this invention is shown.

DESCRIPTION OF THE PREFERRED EMBODIMENT

In the FIGURE, a vehicle body generally indicated by 10 includes a conventional windscreen 12 and roof 14 that cooperates with the floor 15 forming part of the usual transmission tunnel 16 to define an occupant compartment 18. A conventional vehicle seat 20 is supported on the floor 15 within the occupant compartment 18 in the usual manner and is accessible through the open door 22 pivoted to the vehicle body 10.

A three-point safety belt of this invention generally indicated by 30 includes a lap belt 32 one end of which is fixedly shown anchored to a lower rear portion of the door 22 by an anchor 36. The other end of the lap belt 32 is received by a conventional inertia retractor 35 which is mounted on the rear portion of the transmission tunnel 16 behind of the seat 20. Consequently, the lap belt 32 is protracted from the retractor with the opening movement of the door 22, while it is retracted by and into the retractor 35 to an occupant restraining position as the door is moving to a closed position.

A shoulder belt 33 has one end connected to a middle portion of the lap belt 32, while the other end of the shoulder belt 33 is operatively connected to a conventional inertia retractor 34 mounted on an outboard portion of a vehicle roof behind the seat 20. Thus, when the door is closed, the shoulder belt 33 is retracted by the retractor 34 along with the aforementioned movement of the lap belt 32 and assumes an occupant restraining position in which it extends across the chest of the occupant.

According to the safety belt arrangement of this invention, a belt hanger 37, preferably in the form of a hooked arm is mounted, for example, on a forward inboard portion of the roof opposite to the retractor 34. The occupant is thus capable of hanging on the hanger 37 a portion of the shoulder belt when it is not in use, particularly advantageously when he or she is entering or getting off the vehicle as will be further described. Of course, the hanger may be mounted to another body portion above the occupant's head which is accessible to the occupant.

In operation of the safety belt arrangement as described, the occupant who is about to enter the occupant compartment 18 opens the door 22, whereupon the lap and shoulder belts are protracted to the length corresponding to the degree of the door opening and assume an easy-entry position shown in the FIGURE. The occupant will then hang the middle portion of the shoulder belt 33 on the hanger 37 further pulling out the shoulder belt from the retractor 34. The length of the shoulder belt has to be such that when it rests on the hanger 37 in the fully open position of door 22, the shoulder belt is kept in a taut condition, while the lap belt, specifically its connection to the shoulder belt, is pulled upwardly away from the seat 20 to the extent that enough space for the occupant's lap and hip is assured. The occupant is therefore able to easily enter the occupant compartment 18 snugly accommodating himself on the seat. The occupant just seated will then remove the shoulder belt 33 from the hanger 37 and shut the door 22. As soon as this occurs, the shoulder and lap belts are rewound into the inertia retractors 34 and 35 in the manner already described to assume their occupant restraining positions.

When getting off the vehicle, the reverse operation will take place, detailed explanation thereof being omitted for brevity.

What is claimed is:

1. In combination with a vehicle body including a floor and a roof defining an occupant compartment having a vehicle seat accessible through a vehicle body opening selectively opened and closed, a vehicle body door having a front edge pivotally secured to the vehicle body for selectively opening and closing said vehicle door opening, an occupant restraining belt arrangement comprising:
a lap belt having one end fixed to a lower rear portion on the inside of the door;
a first inertia retractor mounted adjacent a lower inboard portion of the seat, the first inertia retractor receiving the other end of said lap belt;
a shoulder belt having one end secured to an intermediate portion of said lap belt;
a second inertia retractor mounted adjacent an outboard portion of a roof of the vehicle body behind the seat, the second inertia retractor receiving the other end of said shoulder belt;
a belt hanger fixedly mounted on the vehicle body within the occupant compartment forward and above the seat;
the length along said lap belt between the one end of said lap belt and the intermediate portion of said lap belt and the length of said shoulder belt when said shoulder belt is fully extended from said second inertia retractor being so determined as to provide an arrangement in which when said shoulder belt is hung on said belt hanger and the door is opened to its fully opened position, said lap belt and said shoulder belt assume position for easy entry of an occupant in which said intermediate portion of said lap belt takes a position spaced forward of the body of an occupant of the seat, and when said shoulder belt is removed from said belt hanger and the door is closed, said lap belt and said shoulder belt take an occupant-restraining position in which said intermediate portion of said lap belt takes a position adjacent an inboard portion of the seat so that said shoulder belt extends across the chest of the occupant of the seat.

* * * * *